(12) United States Patent
Mayumi et al.

(10) Patent No.: US 8,288,298 B2
(45) Date of Patent: Oct. 16, 2012

(54) GLASS COMPOSITION FOR SEALING

(75) Inventors: Yoshitaka Mayumi, Hyogo (JP);
Hideyuki Kuribayasi, Hyogo (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 71 days.

(21) Appl. No.: 12/674,558

(22) PCT Filed: Aug. 21, 2008

(86) PCT No.: PCT/JP2008/064864
§ 371 (c)(1),
(2), (4) Date: Nov. 9, 2010

(87) PCT Pub. No.: WO2009/025313
PCT Pub. Date: Feb. 26, 2009

(65) Prior Publication Data
US 2011/0053753 A1    Mar. 3, 2011

(30) Foreign Application Priority Data

Aug. 22, 2007 (JP) ................................. 2007-216519

(51) Int. Cl.
*C03C 8/24* (2006.01)
*C03C 3/066* (2006.01)

(52) U.S. Cl. ................. 501/15; 501/17; 501/21; 501/75

(58) Field of Classification Search ................. 501/14, 501/15, 17, 21, 75
See application file for complete search history.

(56) References Cited

U.S. PATENT DOCUMENTS

| | | | | |
|---|---|---|---|---|
| 4,965,229 | A * | 10/1990 | Nishino et al. | 501/14 |
| 7,964,523 | B2 * | 6/2011 | Mayumi et al. | 501/77 |

FOREIGN PATENT DOCUMENTS

| | | |
|---|---|---|
| JP | 60-235744 | 11/1985 |
| JP | 01-239038 | 9/1989 |
| JP | 2007-161569 | 6/2007 |

* cited by examiner

*Primary Examiner* — Karl Group
(74) *Attorney, Agent, or Firm* — Hamre, Schumann, Mueller & Larson, P.C.

(57) ABSTRACT

Disclosed is a glass composition which is adapted to use in providing a hermetic seal between a metal and a ceramic, a metal and a metal, and a ceramic and a ceramic, to form crystallized glass having high strength and high thermal expansion which allow it to be used at high temperatures of 950° C. and over. The glass composition is substantially free of alkali metals, and contains, as calculated as oxide, 15-30 mass % of $SiO_2$, 0-5 mass % of $Al_2O_3$, 20-35 mass % of $B_2O_3$, 10-25 mass % of CaO, 25-40 mass % of MgO, 3-8 mass % (3.0% excluded) of $ZrO_2$, and 0-3 mass % of $CeO_2$, wherein the crystallized glass which is formed by firing a glass powder made of the glass composition at a temperature of 850-1050° C. has a thermal expansion coefficient of $90\text{-}110 \times 10^{-7}/°$ C. at 50-550° C. and flexural strength of not less than 80 MPa.

5 Claims, 2 Drawing Sheets

GLASS COMPOSITION FOR SEALING

TECHNICAL FIELD

The present invention relates to glass compositions used to provide a hermetic seal between a metal and a ceramic, a metal and a metal, as well as a ceramic and a ceramic, and more specifically, to glass compositions for hermetic sealing which are used as a sealant, e.g., to cement a gap between each cell of solid oxide fuel cells (SOFC) and a metal to which it is attached, as well as to seal those metals.

BACKGROUND ART

As a sealant for solid oxide fuel cells (SOFC), crystallized glass has been proposed, with which, however, there has been a problem that deterioration in sealing performance occurs when exposed to high temperatures for an extended period of time, due to partial transformation or melting of the precipitated crystals.

In particular, there has been a problem that when exposed to high temperatures of 970° C. or over, cracks are formed in the crystallized glass, which brings about deterioration of the sealing performance, due to partial melting of precipitated crystals leading to a change in its thermal expansion coefficient and loss of linearity of the thermal expansion coefficient.

[Patent Document 1] Japanese Patent Application Publication No. 2007-161569

DISCLOSURE OF INVENTION

Problem to be Solved by the Invention

Against the above-mentioned background, the objective of the present invention is to provide glass compositions for forming such a crystallized glass that has high strength along with high thermal expansion and is adapted to use at high temperatures of 950° C. and over, and which composition is suitably used for providing a hermetic seal between a metal and a ceramic, a metal and a metal, as well as a ceramic and a ceramic.

Means to Solve the Problem

The present inventors, as a result of studies performed to solve the problem mentioned above, found that a $SiO_2$—$B_2O_3$—$CaO$—$MgO$—$ZrO_2$-based glass composition, when prepared to fall within a particular ingredients range, gives, through firing of it in the form of powder at 850-1050° C., a high strength glass-ceramic having a thermal expansion coefficient of $90\text{-}110 \times 10^{-7}$ (50-550° C.), which is compatible to metals and ceramics, and high linearity of its thermal expansion curve. The present invention was completed based on this finding and though further studies.

Thus the present invention provides what follows:

1. Glass composition for providing a hermetic seal which composition is substantially free of alkali metals and contains, as calculated as oxide,
$SiO_2$ 15-30 mass %,
$Al_2O_3$ 0-5 mass %,
$B_2O_3$ 20-35 mass %,
$CaO$ 10-25 mass %,
$MgO$ 25-40 mass %,
$ZrO_2$ 3-8 mass % (3.0% excluded), and
$CeO_2$ 0-3 mass %,
wherein crystallized glass which is formed by firing a glass powder made of the glass composition at a temperature of 850-1050° C. has a thermal expansion coefficient of $90\text{-}110 \times 10^{-7}$/° C. at 50-550° C. and flexural strength of not less than 80 MPa.

2. The glass composition according to 1 above containing, as calculated as oxide, 30-35 mass % of $B_2O_3$.

3. The glass composition according to 1 or 2 above containing, as calculated as oxide, 3.5-8 mass % of $ZrO_2$.

4. The glass composition according to one of 1 to 3 above containing, as calculated as oxide, not more than 3 mass % of $La_2O_3$.

5. Glass powder made of the glass composition according to one of 1 to 4 above, the glass powder having the mean particle size of 2-50 μm.

6. Glass-ceramic powder comprising the glass powder according to above and one or more of ceramic powder selected from the group consisting of alumina, zirconia, preferably partially stabilized zirconia, magnesia, forsterite, steatite, diopside, suanite, and kotoite, wherein the content of the ceramic powder to the content of the glass powder is not more than 20 mass %.

Effect of the Invention

According to the present invention defined above, a glass composition can be provided, in a form substantially free of alkali metals, which composition, when made into powder and fired, crystallizes to form a crystallized glass having high thermal expansion coefficient, high linearity of its thermal expansion curve, and high strength. Thus, the glass composition according to the present invention can be employed as a hermetic sealant at parts where hermetic sealing is needed between a metal and a ceramic, a metal and a metal, or a ceramic and a ceramic, which are used at high temperatures, such as the sealed parts of solid oxide fuel cells and exhaust gas sensors. In particular, the crystallized glass obtained by firing the powder of the glass composition according to the present invention exhibits such excellent properties that it maintains its insulation performance even when exposed to high temperatures of 700-1000° C. for an extended period of time, and that it shows no reduction in its viscosity at such high temperatures. Therefore, when employed as a hermetic sealant for parts to be sealed of solid oxide fuel cells or the like, it can enhance insulation performance of the sealed part as well as the durability of the seal.

BEST MODE FOR CARRYING OUT THE INVENTION

Figure 1:
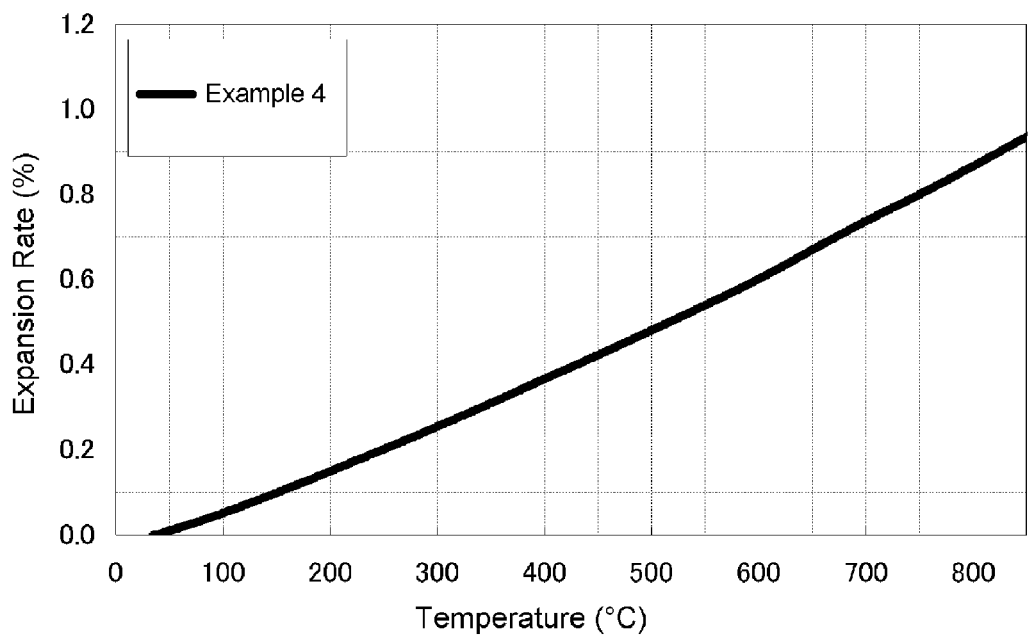
[FIG. 1] Thermal expansion curve for the sintered body of Example 4.

The glass composition according to the present invention, when it is applied in a dry pressed or paste form to fill parts to be sealed of a SOFC, which is built with metals (SUS) and ceramics, and then fired, turns to crystallized glass and provides a hermetic seal between them by binding to the surfaces of both the metal and ceramic at the parts to be sealed. Firing may be carried out at 850-1050° C. (e.g., 1000° C.).

The glass composition (which is not crystallized) for hermetic sealing is obtained by blending and mixing metal oxides as raw materials, melting them (e.g., at 1300-1500° C.), and cooling the melt. Powder of the glass composition may be produced by pulverizing the composition (glass block) by a conventional way.

In the present invention, the term "substantially free of alkali metals" means not to employ such a raw material at all that contains alkali metals as one of its major components, but does not exclude employment of one which is contaminated with a minute amount of alkali metals coming from raw materials for each component (and, when applicable, inorganic fillers added) forming the glass. The amount of alkali metals in the glass composition for providing a hermetic sea according to the present invention is preferably not more than 100 ppm, more preferably not more than 30 ppm, and particularly preferably not more than 10 ppm.

As the glass composition according to the present invention is preferably free of lead (less than 1000 ppm Pb) from the viewpoint of environment conservation, employment of a lead-containing raw material should be avoided.

In the glass composition for providing a hermetic seal according to the present invention, $SiO_2$ is a glass network former component, and it is an essential component for improving the stability (i.e., the property serving to avoid crystallization and thus maintain the glass state) of the glass during the production of the glass bulk, and also for generation of $CaO$—$MgO$—$SiO_2$-based highly expansive crystals (diopside, and the like) in the firing process following pulverization. Glass compositions which chiefly precipitate $CaO$—$MgO$—$SiO_2$-based (diopside, and the like) or $MgO$—$SiO_2$-based (enstatite, forsterite, and the like) crystals are less likely to suffer transformation in their crystalline phases at the firing temperatures, and thus have a tendency to stabilize strength after their crystallization.

On the other hand, a condition that crystals are already formed in the glass bulk is undesirable, for in such a case there likely will cause a problem that glass powder produced by its pulverization will, due to accelerated crystallization during firing for hermetic sealing, suffer reduced fluidity of the composition at early stages after the start of firing and, by being prevented from flowing, leave a gap after firing between itself and the object to be sealed. A content of $SiO_2$ being less than 10 mass % would be undesirable because that would bring about reduced stability of the glass during the production of the glass bulk, and further because it would prevent sufficient generation of $CaO$—$MgO$—$SiO_2$-based highly extensive crystals (such as diopside) during the process of firing following pulverization. A content of $SiO_2$ exceeding 30 mass % would be also undesirable. This is because, above 30 mass %, deterioration of the linearity occurs in the thermal expansion curve for the crystallized glass obtained by firing, and this gives rise to a marked inflection point, which may act as a cause of cracks or detachment in a temperature range corresponding to the inflection point due to a strong stress and strain created in the interface between the object to be sealed and the crystallized glass at the site of sealing.

Considering these, the content of $SiO_2$ is preferably not less than 15 mass %, and preferably not more than 30 mass %, more preferably not more than 25 mass %, and still more preferably not more than 22 mass %. Therefore, the content of $SiO_2$ may be, for example, 15-30 mass %, 15-25 mass %, or 15-22 mass %, or the like.

$Al_2O_3$, though not an essential component, is a component that is useful for enhancement of the stability of the glass during the production of the glass bulk, and for adjustment of the crystallization starting temperature, and for maintaining the adhesive power to the metal. A content of $Al_2O_3$ exceeding 5 mass % would be undesirable because it would cause glass phase to be left behind at a high proportion after firing, thereby deteriorating the linearity of the thermal expansion curve. Considering these, the content of $Al_2O_3$ is preferably not less than 0.1 mass %, more preferably not less than 0.5 mass %, and preferably not more than 5 mass %, more preferably not more than 3 mass %. Thus, when $Al_2O_3$ is included, its content may, for example, be 0.1-5 mass %, 0.5-5 mass %, or 0.1-3 mass %, or the like.

$B_2O_3$ is a glass network former component and an essential component for prevention of crystallization from occurring by enhancing the stability of the glass during production of the glass bulk, for lowering the crystallization temperature of the glass during firing following pulverization, and for allowing generation of $MgO$—$B_2O_3$-based highly expansive crystals. A content of $B_2O_3$ being less than 20 mass % would be undesirable, not only because it will lower the stability of the glass during production of the glass bulk, thereby making the glass inclined toward crystal precipitation, but also because it would prevent sufficient formation of $MgO$—$B_2O_3$-based crystals during firing following pulverization. Furthermore, a content of $B_2O_3$ exceeding 35 mass % would be undesirable because it would cause increased amount of glass phase to evade crystallization and be left behind after firing, thereby greatly deteriorating the linearity of the thermal expansion curve.

Considering these, the content of $B_2O_3$ is preferably not less than 20 mass %, more preferably not less than 22 mass %, still more preferably not less than 25 mass %, and preferably not more than 35 mass %, more preferably not more than 32 mass %, and still more preferably not more than 30 mass %. Thus, the content of $B_2O_3$ may, for example, be 20-35 mass %, 22-35 mass %, or 25-32 mass %, or the like.

CaO is an essential component for the formation of $CaO$—$MgO$—$SiO_2$-based highly expansive crystals. A content of CaO being less than 10 mass % would be undesirable, for in such a case not a high crystallinity could be achieved after the firing for hermetic sealing, and a greater amount of glass phase would be left relative to the crystal phase, making the seal less heat resistant. On the other hand, its content exceeding 25 mass % would be undesirable, for in such a case crystals having the melting point not higher than 980° C. would likely be precipitate, thus lowering the strength of the seal.

Considering these, the content of CaO is preferably not less than 10 mass %, more preferably not less than 13 mass %, and preferably not more than 25 mass %, more preferably not more than 22 mass %, and still more preferably not more than 20 mass %. Thus, the content of CaO may, for example, be 10-25 mass %, 13-22 mass %, or 13-20 mass %, or the like.

MgO is an essential component for the formation of $MgO$—$B_2O_3$-based, $CaO$—$MgO$—$SiO_2$-based, and $MgO$—$SiO_2$-based highly expansive crystals. A content of MgO being less than 25 mass % would be undesirable, for in such a case not a high crystallinity could be achieved after the firing for hermetic sealing, and a greater amount of glass phase would be left relative to the crystal phase, making the seal less heat resistant. Further, a content of MgO exceeding 40 mass % would be undesirable because it would lower the stability of the glass during production of the glass bulk, making the glass inclined toward crystal precipitation, and this then would reduce the fluidity of the composition during firing of the powder and prevent its flow. Considering these, the content of MgO is preferably not less than 25 mass %, more preferably not less than 27 mass %, still more preferably not less than 29 mass %, and preferably not more than 40 mass %. Thus, the content of MgO may, for example, be 25-40 mass %, 27-35 mass %, or 29-35 mass %, or the like.

$ZrO_2$ is an essential component for enhancing crystallinity of $MgO$—$B_2O_3$-based, $CaO$—$MgO$—$SiO_2$-based, and $MgO$—$SiO_2$-based highly expansive crystals, as well as for forming $ZrO_2$ crystals. However, its content exceeding 8 mass % would be undesirable, because it would make the glass instable during the production of the glass bulk, impairing its ability to be fired (i.e., the ability that it can sinter without leaving a gap between itself and the object to be sealed). The content of $ZrO_2$ being not more than 3 mass % would be undesirable, for in such a case not a high crystallinity could be achieved after the firing for hermetic sealing, and a greater amount of glass phase would be left relative to the crystal phase, deteriorating the linearity of the thermal expansion curve (giving rise to a marked inflection point).

Considering these, the content of $ZrO_2$ is preferably above 3 mass %, more preferably not less than 3.5 mass %, still more preferably not less than 4.5 mass %, and preferably not more than 7 mass %. Thus, the content of $ZrO_2$ may, for example, be 3-8 mass %, 3.5-8 mass %, or 4.5-7 mass %, or the like.

$CeO_2$, though not an essential component, is a component which is useful for adjusting the crystallinity, for increasing the oxidation degree of the glass, and for enhancing the binder-removing ability (the ability to accelerate decomposition of organic component in the paste). On the other hand, the content of $CeO_2$ exceeding 3 mass % would be undesirable, for that would lower the melting point of the precipitated crystals.

Considering these, the content of $CeO_2$ may, for example, be preferably not less than 0.1 mass %, more preferably not less than 0.3 mass %, and preferably not more than 3 mass %. Thus the content of $CeO_2$ may, for example, be 0-3 mass %, 0.1-3 mass %, or 0.3-3 mass %, or the like.

Besides the above-enumerated components, $La_2O_3$, thought not an essential component, is a useful component for maintaining the adhesive power to the metal. On the other hand, a content of $La_2O_3$ exceeding 3 mass % would be undesirable, as it would ower the melting point of the precipitated crystals.

Considering these, when $La_2O_3$ is included, its content is preferably not less than 0.1 mass %, more preferably not less than 0.3 mass %, and preferably not more than 3 mass %, more preferably not more than 2 mass %, still more preferably not more than 1 mass %. Thus, the content of $La_2O_3$, may, for example, be 0-3 mass %, 0.1-2 mass %, or 0.1-1 mass %, or the like.

Further, if part of CaO or MgO is replaced with BaO, SrO or ZnO, it is possible to adjust the thermal expansion coefficient, and to maintain the adhesive power as well. However, a total sum of the content of BaO, SrO and ZnO exceeding 3 mass % would be undesirable, because it would lower the melting point of the precipitated crystals, impairing the strength, and also because corrosion will proceed due to their reaction with the metal surface. Thus, the total sum of the content of BaO, SrO and ZnO is preferably not more than 3 mass %, more preferably not more than 1 mass %.

Besides the components mentioned above, $Fe_2O_3$, CuO, CoO, NiO, $Ln_2O_3$ (lanthanoid) may be added up to an amount of not more than 3 mass % in their total sum for enhancement of stability of the glass during its production, for suppressing the reaction with the metal, for improvement of adhesiveness of the glass sealant to the metal, and for adjustment of the type of precipitating crystals, and their proportions as well During firing, the powder of the glass according to the present invention, after once decreasing in its volume, must soften and flow to wet the metal and ceramic surfaces. Therefore it must have sufficiently high fluidity during firing. For this purpose, its particle size may be adjusted through the conditions applied in dry pulverization. Fine powder made of particles having too small a particle size would be undesirable, for they would bring about accelerated onset of crystallization, which would lead to reduced fluidity of the composition and prevention of flows during firing for hermetic sealing, thereby requiring increased repetition of application of the hermetic sealant and firing, thus adding to the production costs. On the other hand, coarse powder made of large-sized particles would have problems, for one thing, that the particles of the powder would settle and separate while being made into a paste, or the paste being applied or allowed to dry, and further that the crystallization likely would take place inhomogeneously and insufficiently, thus bringing about reduction in strength. The particle size may be adjusted by removing such fine, and coarse, powder as mentioned above through such a process as classification. The mean particle size is preferably not less than 2 μm, more preferably not less than 4 μm, and preferably not more than 50 μm, more preferably not more than 25 μm, and still more preferably not more than 15 μm. The maximum particle size is preferably not more than 150 μm, more preferably not more than 100 μm. Thus the sizes of the particle may be, for example: the mean particle size of 25 μm with the maximum particle size being not more than 150 μm; the mean particle size of 15 μm with the maximum particle size being 100 μm; the mean particle size of 5 μm with the maximum particle size being not more than 100 μm; or the mean particle size of 3.0 μ with the maximum particle size being not more than 15 μm; or the like.

The glass composition for hermetic sealing according to the present invention may be used in the form of glass powder, or in a mixture of it with ceramic powder, to provide a hermetic seal between a ceramic and a metal. For providing a hermetic seal, it can be applied onto the object by printing, or through a dispenser, and then fired at 850-1050° C. Dry pressed powder which has been calcined at a temperature at or near the softening point may be combined with the aforementioned paste.

Furthermore, for the purpose of fine adjustment of the thermal expansion and to accelerate crystallization in the glass and thereby increase its strength, ceramic fillers may be added to the glass powder in such an amount that it may not lower the fluidity of the composition during firing. The filler, if added in an amount of less than 0.01 mass % relative to the glass powder, would have has no effect, and addition of it in an amount exceeding 20 mass % would be undesirable as it would lower fluidity of the composition during firing for hermetic sealing, thus preventing flows. Considering these, the amount of fillers added is preferably 0.01-20 mass %, more preferably 0.03-10 mass %, and still more preferably 0.1-5 mass %.

Examples of ceramic fillers include alumina, zirconia or partially stabilized zirconia, magnesia, forsterite, steatite, diopside, suanite, and kotoite. The mean particle size of ceramic fillers is preferably not more than 20 μm, more preferably not more than 5 μm, and still more preferably not more than 3 μm, and their maximum size is preferably not more than 106 μm, more preferably not more than 45 μm, and still more preferably not more than 22 μm.

EXAMPLES

While the present invention is described in further detain below with reference to typical examples, it is not intended that the present invention be limited to those examples.

Production of Glass Bulk and Glass Powder

Examples 1-13 and Comparative Examples 1-8

Raw materials were blended and mixed to form each composition shown in Tables 1 and 2. The blend of raw materials then was placed in a platinum crucible and melted at 1300-1500° C. for two hours, and gave glass flakes which were the glass bulk of each of Examples or Comparative example. The glass flakes were put in a pot mil and dry pulverized until the mean particle size of 5-10 µm was reached, and after removal of coarse particles with a sieve of 106-µm apertures, gave the glass powder of each of Examples and Comparative Examples.

Test Methods

Each glass powder of Examples and Comparative Examples was measured for its mean glass particle size, and then fired, and the sintered material thus obtained was measured and evaluated for its flexural strength and thermal expansion coefficient.

(1) Mean Particle Size of the Glass Powder

Using a laser scattering particle size analyzer, the value of $D_{50}$ was obtained in the volume-distribution mode.

(2) Flexural Strength

The powder obtained above was dry pressed into a certain shape and fired at 1000° C. The sintered material thus obtained was polished into a column of 4 mm×3 mm×36×mm and measured for transverse strength according to JIS R 1601. Those which fell short of 80 MPa were deemed disqualified.

(3) Thermal Expansion Coefficient

From each sintered material obtained in (2) above, a test piece was cut out with the dimensions of about 5×5×15 mm. For the test piece, thermal expansion coefficient ($\alpha 1$), which was derived based on the two points of 50° C. and 550° C., and thermal expansion coefficient ($\alpha 2$), which was derived based on the two points of 50 and 700° C. were determined, respectively, from a thermal expansion curve produced for the test piece on a TMA measurement apparatus by heating it at a rate of 10° C./min starting from room temperature.

Further, as inflection point appeared at or near 600° C. in the thermal expansion curve, the difference between $\alpha 1$ and $\alpha 2$ above ($\Delta \alpha = \alpha 2 - \alpha 1$) was calculated. Those which exceeded $10 \times 10^{-7}$/° C. in $\Delta \alpha$ were deemed disqualified.

Figure 2:
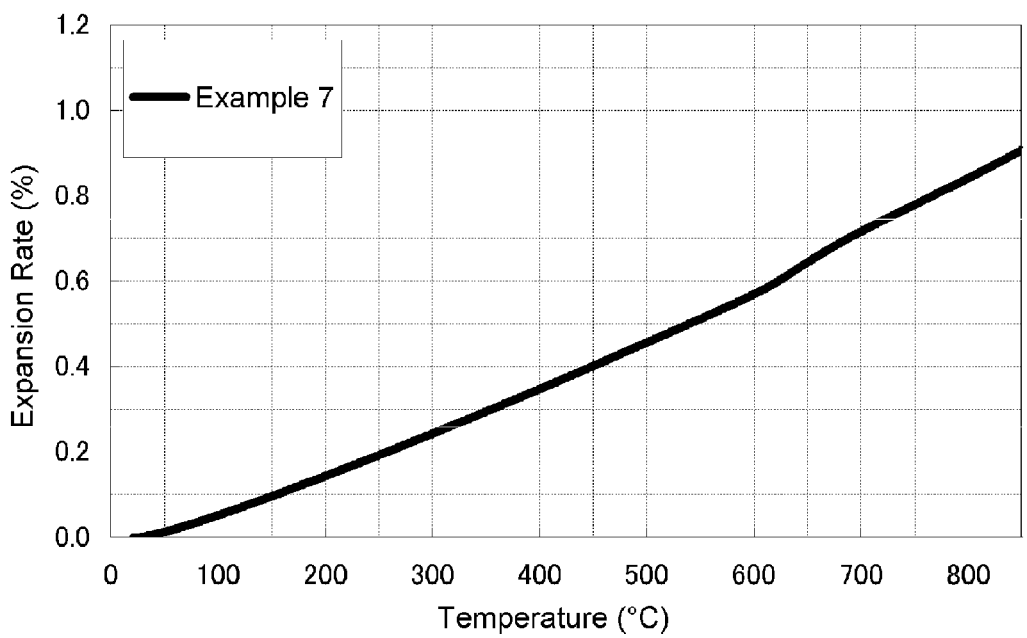
[FIG. 2] Thermal expansion curve for the sintered body of Example 7.
Figure 3:
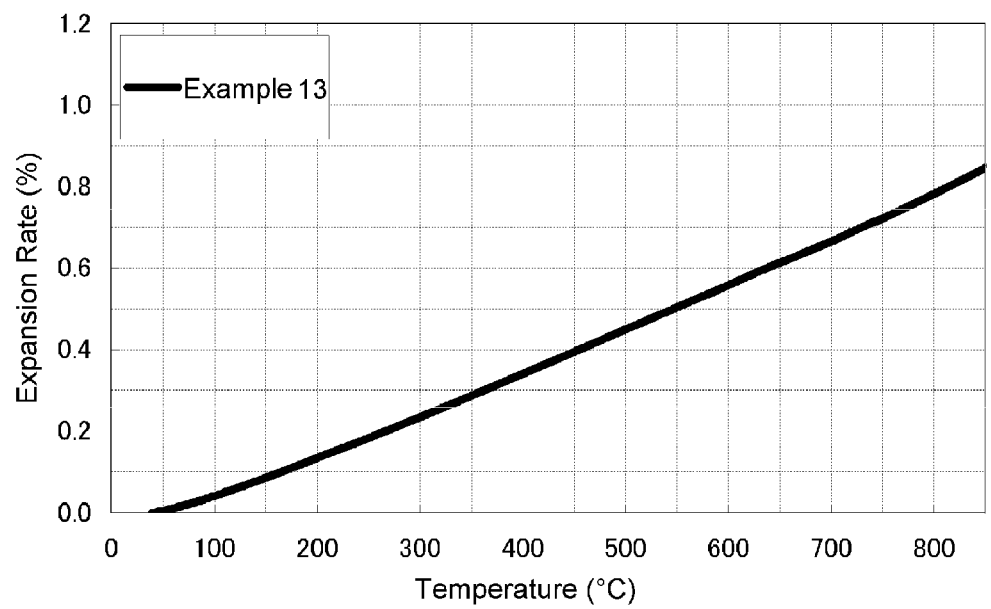
[FIG. 3] Thermal expansion curve for the sintered body of Example 13.
Figure 4:
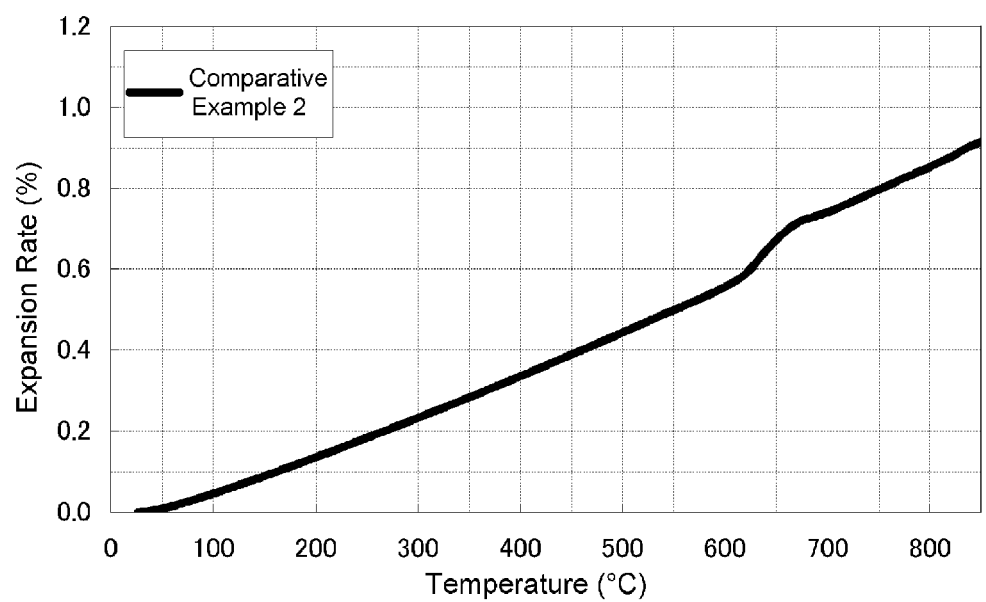
[FIG. 4] Thermal expansion curve for the sintered body of Comparative Example 2.

The results are shown in Tables 1 and 2. As seen in these tables, while the sintered materials based on the glass compositions of Comparative Examples were disqualified with respect as least one of the properties of thermal expansion coefficient or flexural strength, all the sintered materials (crystallized glass) based on the glass of Examples were found to posses both properties sufficiently. Furthermore, while the sintered materials based on the glass of Comparative Examples (e.g., Comparative Example 2), which had relatively large values of $\Delta \alpha$, were found to have a marked inflection point in their thermal expansion curves (FIG. 4), the sintered materials (crystallized glass) based on the glass of Examples (e.g., Examples 4, 7, and 13), which had small values of $\Delta \alpha$, had no such observable inflection point (FIGS. 1-3).

TABLE 1

| Compositions (wt %) | Example 1 | Example 2 | Example 3 | Example 4 | Example 5 | Example 6 | Example 7 |
|---|---|---|---|---|---|---|---|
| $SiO_2$ | 25.0 | 15.5 | 18.5 | 20.0 | 20.0 | 17.5 | 17.5 |
| $Al_2O_3$ | 2.5 | 0.5 | 0.5 | 0.5 | 2.0 | 0.5 | 2.5 |
| $B_2O_3$ | 25.0 | 32.0 | 27.0 | 22.0 | 27.0 | 27.0 | 27.0 |
| MgO | 31.0 | 31.5 | 29.5 | 35.0 | 30.0 | 33.5 | 29.5 |
| CaO | 13.0 | 17.0 | 20.5 | 19.0 | 17.0 | 17.0 | 18.5 |
| $ZrO_2$ | 3.5 | 3.5 | 3.5 | 3.5 | 4.0 | 4.0 | 4.5 |
| $La_2O_3$ | — | — | — | — | — | — | 0.5 |
| $CeO_2$ | — | — | 0.5 | — | — | 0.5 | — |
| Total | 100.0 | 100.0 | 100.0 | 100.0 | 100.0 | 100.0 | 100.0 |
| $\alpha 1$ (× $10^{-7}$/° C.) | 97 | 97 | 97 | 106 | 92 | 99 | 100 |
| $\Delta \alpha$ (× $10^{-7}$/° C.) | 10 | 9 | 4 | 6 | 9 | 4 | 8 |
| Flexural Strength (MPa) | 141 | 112 | 84 | 91 | 138 | 81 | 127 |

| Compositions (wt %) | Example 8 | Example 9 | Example 10 | Example 11 | Example 12 | Example 13 |
|---|---|---|---|---|---|---|
| $SiO_2$ | 17.5 | 15.5 | 18.5 | 18.0 | 20.0 | 17.0 |
| $Al_2O_3$ | 0.5 | 0.5 | 1.0 | 0.5 | 0.5 | 0.5 |
| $B_2O_3$ | 26.0 | 30.5 | 27.0 | 28.0 | 21.5 | 27.0 |
| MgO | 31.0 | 31.5 | 29.5 | 29.5 | 34.0 | 29.5 |
| CaO | 18.0 | 17.0 | 19.0 | 18.5 | 18.5 | 19.0 |
| $ZrO_2$ | 4.5 | 5.0 | 5.0 | 5.0 | 5.5 | 7.0 |
| $La_2O_3$ | — | — | — | — | — | — |
| $CeO_2$ | 2.5 | — | — | 0.5 | — | — |
| Total | 100.0 | 100.0 | 100.0 | 100.0 | 100.0 | 100.0 |
| $\alpha 1$ (× $10^{-7}$/° C.) | 101 | 96 | 96 | 96 | 105 | 100 |
| $\Delta \alpha$ (× $10^{-7}$/° C.) | 9 | 9 | 4 | 9 | 6 | 2 |

TABLE 1-continued

| | | | | | | |
|---|---|---|---|---|---|---|
| Flexural Strength (MPa) | 104 | 111 | 110 | 110 | 94 | 101 |

TABLE 2

| Compositions (wt %) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| $SiO_2$ | 15.5 | 17.5 | 17.5 | 18.0 | 20.0 | 25.0 | 25.0 | 16.0 |
| $Al_2O_3$ | 6.0 | 0.5 | 0.5 | 0.5 | 2.0 | 0.5 | 1.0 | 0.5 |
| $B_2O_3$ | 30.5 | 33.0 | 31.0 | 31.0 | 22.0 | 20.0 | 20.0 | 26.0 |
| MgO | 31.0 | 31.0 | 31.0 | 29.5 | 35.0 | 34.0 | 34.0 | 29.5 |
| CaO | 17.0 | 17.0 | 17.0 | 18.5 | 19.0 | 18.0 | 15.0 | 19.0 |
| $ZrO_2$ | — | 0.5 | 0.5 | 2.0 | 2.0 | 2.5 | 2.5 | 9.0 |
| $La_2O_3$ | — | — | — | — | — | — | 2.5 | — |
| $CeO_2$ | — | 0.5 | 2.5 | 0.5 | — | — | — | — |
| Total | 100.0 | 100.0 | 100.0 | 100.0 | 100.0 | 100.0 | 100.0 | 100.0 |
| $\alpha 1$ ($\times 10^{-7}$/° C.) | 97 | 98 | 98 | 98 | 109 | 101 | 102 | 96 |
| $\Delta\alpha$ ($\times 10^{-7}$/° C.) | 13 | 14 | 12 | 13 | 11 | 7 | 11 | 6 |
| Flexural Strength (MPa) | 101 | 118 | 132 | 136 | 84 | 61 | 63 | 57 |
| Remarks | | | | | | | | Devitrified |

INDUSTRIAL APPLICABILITY

The glass composition according to the present invention can be utilized as a hermetic sealant for providing a hermetic seal between a metal and a ceramic, which is done by firing it at 850-1050° C. while keeping it in contact with the metal and the ceramic, which seal is free of alkali metals and can be used in an environment where it is exposed to temperatures of 700-1000° C. as in solid oxide fuel cells (SOFC).

The invention claimed is:

1. A glass composition for providing a hermetic seal, the composition comprising, as calculated as oxide,
   $SiO_2$ 15-30 mass %,
   $Al_2O_3$ 0-5 mass %,
   $B_2O_3$ 20-35 mass %,
   CaO 10-25 mass %,
   MgO 25-40 mass %,
   $ZrO_2$ 3.5 to 8 mass %,
   $CeO_2$ 0 to 0.5 mass %, and
   $La_2O_3$ 0 to 2 mass %,
   the composition being substantially free of alkali metals, wherein a crystallized glass which is formed by firing a glass powder made of the glass composition at a temperature of 850-1050° C. has a thermal expansion coefficient of 90-110×10$^{-7}$/° C. at 50-550° C. and a flexural strength of not less than 80 MPa.

2. The glass composition according to claim 1 containing, as calculated as oxide, 30-35 mass % of $B_2O_3$.

3. The glass composition according to claim 1 containing, as calculated as oxide, 4.5 to 7 mass % of $ZrO_2$.

4. Glass powder made of the glass composition according to claim 1, the glass powder having the mean particle size of 2-50 μm.

5. A glass-ceramic powder comprising the glass powder according to claim 4 and one or more of ceramic powder selected from the group consisting of alumina, zirconia including partially stabilized zirconia, magnesia, forsterite, steatite, diopside, suanite, and kotoite, wherein the content of the ceramic powder to the content of the glass powder is not more than 20 mass %.

* * * * *